United States Patent [19]

Cantone

[11] Patent Number: 5,163,229
[45] Date of Patent: Nov. 17, 1992

[54] PLUMB AND HORIZONTAL LOCATING DEVICE

[76] Inventor: Giovanni F. Cantone, R.D. 1, Box 90, Starrucca, Pa. 18462

[21] Appl. No.: 755,560

[22] Filed: Sep. 5, 1991

[51] Int. Cl.⁵ ............................................. G01C 9/14
[52] U.S. Cl. ........................................ 33/227; 33/283; 33/286; 33/292; 33/397; 33/299
[58] Field of Search ............... 33/227, 282, 283, 391, 33/395, 397, 291, 295, 281, 285, 286, 292, 300, 365, 299

[56] References Cited

U.S. PATENT DOCUMENTS

| | | |
|---|---|---|
| 280,713 | 7/1883 | Bostrom . |
| 313,290 | 3/1885 | Cramer ................................. 33/397 |
| 392,209 | 11/1888 | Lee . |
| 1,328,370 | 1/1920 | Dutton ................................. 33/397 |
| 1,884,728 | 10/1932 | Kiesel ................................... 33/395 |
| 1,924,761 | 8/1933 | Turner ................................. 33/397 |
| 2,026,895 | 1/1936 | Hudlow . |
| 2,285,965 | 6/1942 | Halstead . |
| 2,385,424 | 9/1945 | Shue et al. . |
| 2,523,351 | 9/1950 | Armstrong . |
| 2,713,211 | 7/1955 | Fella . |
| 3,044,173 | 7/1962 | O'Neal et al. . |
| 3,505,739 | 12/1967 | Abrams . |
| 3,772,797 | 11/1973 | Gleba . |
| 3,772,798 | 1/1973 | Kijima . |
| 3,909,952 | 10/1975 | Lagasse . |
| 3,911,588 | 10/1975 | Ohneda . |
| 3,988,837 | 11/1976 | Benson . |
| 4,106,207 | 8/1978 | Boyett et al. . |
| 4,206,550 | 6/1980 | Boyett et al. . |
| 4,696,111 | 9/1987 | Gardner ............................... 33/282 |
| 5,012,585 | 5/1991 | DiMaggio . |

FOREIGN PATENT DOCUMENTS 0234926 4/1986 Fed. Rep. of Germany ........ 33/397

Primary Examiner—William A. Cuchlinski, Jr.
Assistant Examiner—Alvin Wirthlin
Attorney, Agent, or Firm—Richard A. Inz; Donald L. Rhoads

[57] ABSTRACT

A device is disclosed for accurately and precisely locating specific points on ceilings or, alternatively, on the the same horizontal plane. A light emitting means, a pendulum, a support, and two cylindrical rods act in concert to provide a light beam that is always plumb or always horizontally level.

17 Claims, 2 Drawing Sheets

PLUMB AND HORIZONTAL LOCATING DEVICE

BACKGROUND OF THE INVENTION

This invention relates to a plumb and horizontal locating device that can be used for making measurements and for locating the features of a ceiling. Alternatively, the locating device can be used to locate one point on the same horizontal plane as another point. The device is simple, accurate and can be made to be inexpensive.

Craftsmen such as carpenters, electricians, plumbers, architects and others must often precisely locate a point on a room's ceiling. Locating the point may be needed for hanging or locating fixtures, moldings, pipes, sprinklers, heating ducts or other items. Architects and builders may need to measure a ceiling's components and features in preparing architectural plans. In the past, a person would climb a ladder or ladders and measure and locate the point. They might use a measuring tape or drop a plumb line to the floor to identify the point of interest. This can be dangerous and complicated. It can also require two or more people and be time consuming. When a ceiling is sloped or very high the problem becomes even worse. A sloped ceiling may require the use of complex mathematical formulas to locate a point. With these old methods accuracy and speed were often sacrificed.

Locating devices were developed in the past to help with this ceiling feature locating and measurement problem. However, these devices have suffered from being complex and expensive. They used components such as friction-proof bearings, adjusting screws and air bubbles which add to the expense and make the locating device sensitive to jarring and rough handling.

Another problem facing craftsmen occurs when trying to determine if two points are on the same horizontal, level plane. This problem occurs when building walls, swimming pools and in a variety of other situations. Leveling devices with spirit-type components are used but are useless for comparing points that are far apart. Clear hoses with water inside have also been used but they suffer from being large and clumsy to handle.

It would thus be desirable to be able to make measurements and locate features of a ceiling without ladders and without complex or expensive devices. It would also be desirable to easily locate points which are on the same horizontal, level plane even though the points are a large distance apart.

SUMMARY OF THE INVENTION

It is an object of this invention to provide a locating device that solves many of the problems and limitations found in previously used devices and to provide a simple, precise and accurate locating device for locating points and making measurements.

It is another object of this invention to provide a locating device that is simple and inexpensive.

It is another object of this invention to provide a locating device that is compact and that does not have many components which would add to the expense or add to the locating device's sensitivity to jarring and rough handling.

It is a further object of this invention to provide a locating device that will work on rough, uneven floors or on rough and unlevel ground.

Other objects of the present invention will become apparent upon reading the following specification and referring to the accompanying drawings.

In accordance with these objects of the invention, the invention provides a plumb and horizontal locating device partially consisting of a pendulum, a support, and two cylindrical rods. The components act in concert to provide a light beam that is always vertical and can be used to locate a ceiling's features or make measurements of a ceiling's features from a reference point from or to the floor. In an alternative embodiment, the same components act in concert to provide a light beam that is horizontally level and can be used to locate a point that is on the same horizontal, level plane as a reference point. Another, different embodiment provides a simple device for surveyor-type applications.

DESCRIPTION OF THE PREFERRED EMBODIMENTS

Figure 1:
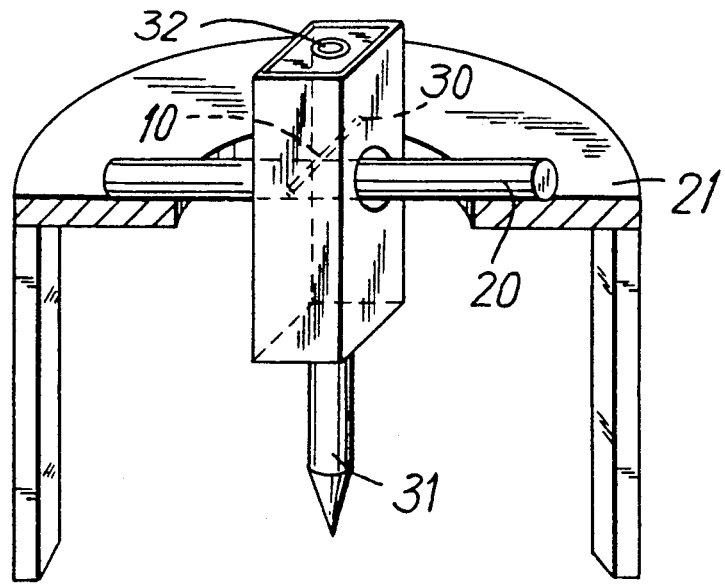
FIG. 1 is a perspective view of an embodiment of this invention, shown with the support means partially cut away.
Figure 2:
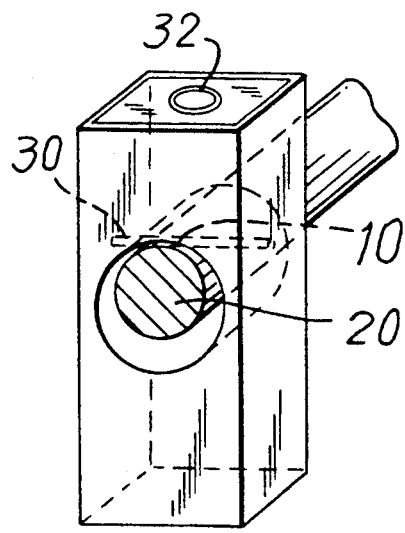
FIG. 2 is a perspective view of a portion of an embodiment of this invention.
Figure 3:
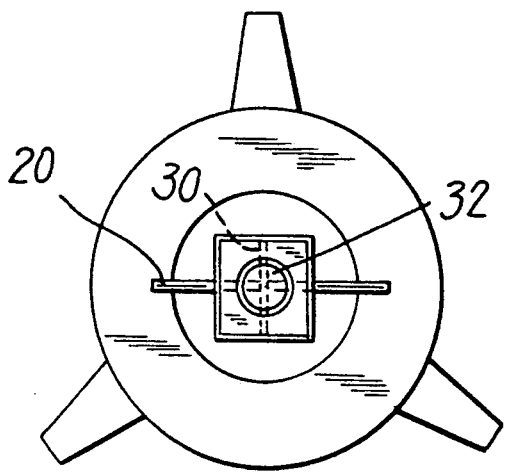
FIG. 3 is a top-down view of the embodiment of this invention as shown in FIG. 1.

Referring to the drawings wherein like characters of reference indicate corresponding parts throughout, FIG. 1 shows a perspective view of an embodiment of this invention. The invention uses a pendulum 31 supported by two cylindrical rods (20, 30) positioned at right angles to one another, as shown in FIG. 1–FIG. 5. The two cylindrical rods are positioned to contact one another at a single point of contact 10. The single point of contact 10 can change if either cylindrical rod is rotated. When a cylindrical rod is rotated, the single point of contact 10 simply changes to another place on the cylindrical rods.

EXAMPLE 1

A first cylindrical rod 20 rests on or is attached to a support means 21. The support means 21 is placed on the floor or ground and the support means 21 supports the entire locating device. In a preferred embodiment, the support means is a tripod. The three leg embodiment of the support means provides a stable platform for the locating device on any terrain; it is envisioned that this invention will be used on construction sites or building remodeling projects where the floor or ground may not be level or flat or where the surface may be rough or littered with obstacles.

Another embodiment of this invention provides for a support means that is hand-held.

A second cylindrical rod 30 is attached to a pendulum 31. In a preferred embodiment shown in FIG. 1, attached to the pendulum 31 is a light emitting means 32. The light emitting means directs a beam of light perpendicular to the second cylindrical rod 30 that is connected to the pendulum 31. In this embodiment, it is necessary that this beam of light from the light emitting means 32 be precisely perpendicular to the second cylindrical rod 30 that is connected to the pendulum 31.

The light emitting means 32 may be comprised of a flashlight or bulb, battery and electrical circuit or a laser. It is important that the light emitting means provides a relatively small, focused beam of light that is parallel to the pendulum 31. Adjustable focusing means and cross hairs may be added to the light emitting means to increase the device's accuracy.

The pendulum 31 is weighted so that it is accurately and precisely vertical. The beam of light from the light emitting means 32 is thus also accurately and precisely vertical because, as stated previously, the beam of light is parallel to the pendulum 31.

The weighting of the pendulum 31 makes the pendulum 31 vertical because gravity acts on the weighting to stabilize the pendulum 31 to its most stable, lowest position.

As shown in FIG. 1, the only point of contact between the pendulum 31, the attached second cylindrical rod 30 and the attached light emitting means 32, on the one hand, and the rest of the locating device, on the other hand, is the single point of contact 10 between the first cylindrical rod 20 that is connected to the support means 21 and the second cylindrical rod 30 that is connected to the pendulum 31. The pendulum 31 is allowed to rotate freely or move its single point of contact 10 but it will always come to rest in a precisely vertical position because of the aforementioned effect of gravity acting on the weighting of the pendulum 31.

No matter what the position is of the support means 21 and the first cylindrical rod 20 that is connected to the support means 21, the pendulum 31 will rotate or move on the single point of contact 10 to the vertical position. This allows the locating device of this invention to be used on rough, uneven and unlevel terrain or floors.

The two cylindrical rods, the light emitting means 32, the pendulum 31 and the support means 21, all work in concert to precisely, accurately and efficiently aid in making measurements of a ceiling's features and in locating specific points on a ceiling. The measurements and locating are done on the floor safely and easily since the locating device of this invention can be used to find reference points on the floor that reflect the ceiling's characteristics.

The support means 21 is positioned under the ceiling feature of interest. The beam of light from the light emitting means 32 is then directed to the feature of interest on the ceiling. Because of gravity, the pendulum 31 will always be vertical so that a point directly below the pendulum 31 on the floor is the point directly below the ceiling feature of interest. Measurements can then be made from this identified point on the floor and these measurements will reflect the ceiling's characteristics.

Alternatively, the locating device of this invention can be used to find the part of the ceiling that corresponds to a specific point on the floor.

EXAMPLE 2

Figure 4:
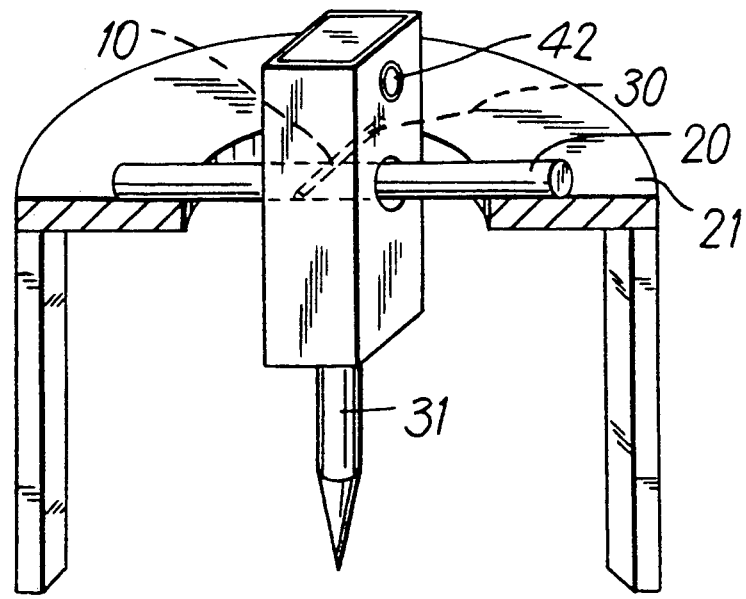
FIG. 4 is a perspective view of an embodiment of this invention containing a horizontal light emitting means, shown with the support means partially cut away.

Another embodiment of this invention is shown in FIG. 4. It uses the light emitting means 42 in a position parallel to the second cylindrical rod 30 that is connected to the pendulum 31. When the pendulum 31, with the attached light emitting means 42 and the second cylindrical rod 30, is weighted properly, the beam of light from the light emitting means 42 will point precisely horizontal. Masons, carpenters, landscapers and others desiring to find a horizontally level point can use this embodiment.

EXAMPLE 3

Another embodiment of this invention, with the light emitting means oriented either horizontally or vertically or at an angle, emits a light beam from two ends or sides. The light beam is oriented so the light beam coming from the one end or side of the locating device is on the same plane and line as the light beam from the other end or side.

Thus, in this embodiment, where the light emitting means is pointing vertically, the point on the ceiling identified by the light beam is also identified by the beam on the floor. Likewise, where the light beam is emitted horizontally, the locating device could be set up in a room and the horizontally level counterpart to a point on one wall of the room could be found on an opposite wall, both identified by the light beam. These are just some of the many practical applications that can be used with these embodiments.

EXAMPLE 4

Figure 5:
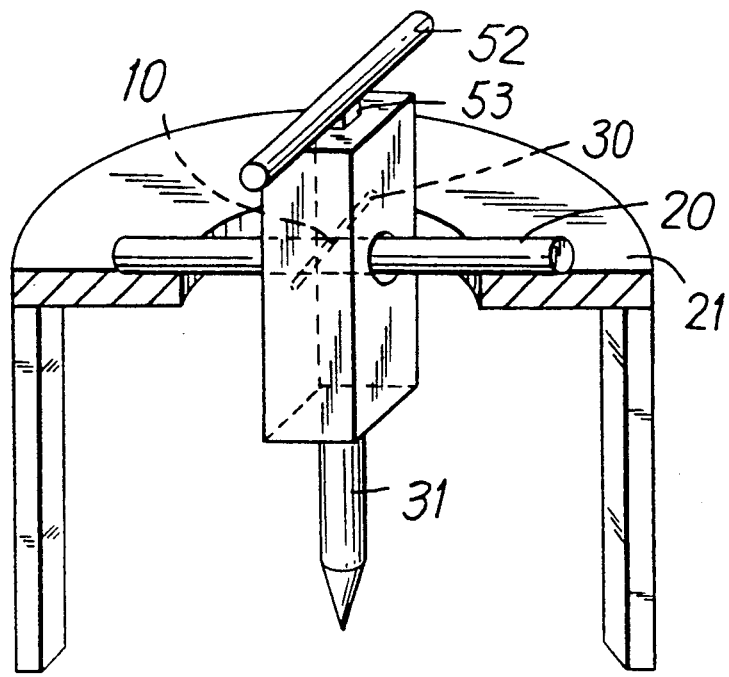
FIG. 5 is a perspective view of an embodiment of this invention containing an optical means, shown with the support means partially cut away.

The pendulum-single point of contact design of this invention for finding plumb is envisioned to have other applications. One such application, as shown in FIG. 5, is a surveyor's transit or other surveying-type instruments. With the same pendulum-single point of contact design as illustrated above in Example 1, the surveyor's transit could simply and easily be made to be vertical or plumb. If optical means 52 were substituted for the light emitting means 32, the optical means 52 could be used to always find what is directly above. Alternatively, making the angle of the optical means adjustable via attachment means 53 of the optical means would provide a simple, adjustable means for locating specific points of interest at any angle in reference to plumb. Care must be taken to see that the pendulum is weighted properly. For an example of this embodiment, if the optical means 52 is set parallel to the second cylindrical rod 30 that is connected to the pendulum 31, the locating device could be used by masons or others for finding a line that is horizontally level by location points through telescope-like optical means 52 that can be focused.

One skilled in the art will appreciate that the present invention can be practiced by other than the described embodiments, which are presented for purposes of illustration and not of limitation, and the present invention is limited only by the claims that follow.

What is claimed is:

1. A device for locating specific points on a ceiling comprising:
  a support means with a first cylindrical rod having a substantially straight portion; and
  a light emitting means attached to a pendulum, said pendulum attached to a second cylindrical rod having a substantially straight portion, the light emitting means producing a beam of light that is perpendicular to the second cylindrical rod, the second cylindrical rod solely supporting the pendulum by a single point of contact between the second cylindrical rod and the first cylindrical rod, said single point of contact occurring on the substantially straight portions of said first and second cylindrical rods the second cylindrical rod oriented at a 90° angle to the first cylindrical rod, the second cylindrical rod being free to change the single point of contact made with the first cylindrical rod so that gravity will act on the pendulum to move the single point of contact the second cylindrical rod makes on the first cylindrical rod so that the light emitting means emits the beam of light vertically.

2. The device of claim 1 wherein the support means includes a tripod.

3. The device of claim 1 wherein the light emitting means includes a light bulb, a battery and an electrical circuit.

4. The device of claim 1 wherein the light emitting means includes a laser.

5. The device of claim 1 wherein the light emitting means includes a light focusing means.

6. The device of claim 1 wherein the light emitting means includes cross hairs so that the cross hairs are projected with the beam of light.

7. A device for locating two specific points that are horizontally level with each other comprising:
- a support means with a first cylindrical rod having a substantially straight portion; and
- a light emitting means attached to a pendulum, said pendulum attached to a second cylindrical rod having a substantially straight portion, the light emitting means producing a beam of light that is parallel to the second cylindrical rod, the second cylindrical rod solely supporting the pendulum by a single point of contact between the second cylindrical rod and the first cylindrical rod said single point of contact occurring on the substantially straight portions of said first and second cylindrical rods, the second cylindrical rod oriented at a 90° angle to the first cylindrical rod, the second cylindrical rod being free to change the single point of contact made with the first cylindrical rod so that gravity will act on the pendulum to move the single point of contact the second cylindrical rod makes on the first cylindrical rod so that the light emitting means emits the beam of light horizontally.

8. The device of claim 7 wherein the support means includes a tripod.

9. The device of claim 7 wherein the light emitting means includes a light bulb, a battery and an electrical circuit.

10. The device of claim 7 wherein the light emitting means includes a laser.

11. The device of claim 7 wherein the light emitting means includes light focusing means.

12. The device of claim 7 wherein the light emitting means includes cross hairs so that the cross hairs are projected with the beam of light.

13. A surveyor-type optical instrument for locating specific points comprising:
- a support means with a first cylindrical rod having a substantially straight portion; and
- an optical means attached to a pendulum, said pendulum attached to a second cylindrical rod having a substantially straight portion, the second cylindrical rod solely supporting the pendulum by a single point of contact between the second cylindrical rod and the first cylindrical rod said single point of contact occurring on the substantially straight portions of said first and second cylindrical rods, the second cylindrical rod oriented at a 90° angle to the first cylindrical rod, the second cylindrical rod being free to change the single point of contact made with the first cylindrical rod so that gravity will act on the pendulum to move the single point of contact the second cylindrical rod makes on the first cylindrical rod so that the pendulum is vertical.

14. The device of claim 13 wherein the support means includes a tripod.

15. The device of claim 13 wherein the optical means includes a telescope that can be focused.

16. The device of claim 13 wherein the optical means includes a light emitting means.

17. The device of claim 13 wherein the optical means is attached to said pendulum by adjustable means so that the angle made between the optical means and the second cylindrical rod can be varied.

* * * * *